Figure 1:
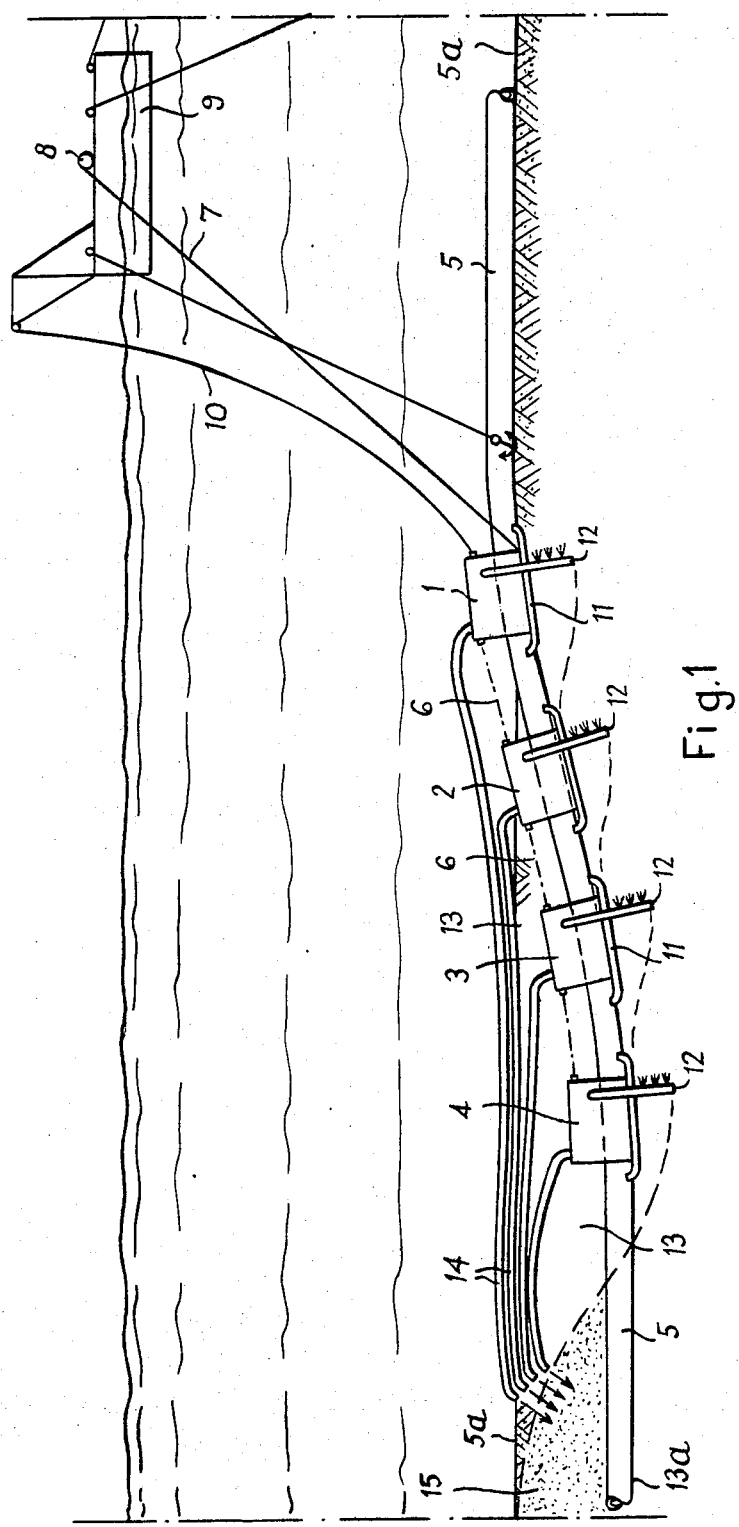

United States Patent
Volbeda

[15] 3,673,808
[45] July 4, 1972

[54] METHOD OF AND APPARATUS FOR BURYING SUB-SEA PIPELINES, CABLES AND THE LIKE

[72] Inventor: Johan H. Volbeda, Rijswijk, Netherlands

[73] Assignee: Nederlandse Maatschappij voor werken Buitengaats (Netherlands Offshore Company) N.V., The Hague, Netherlands

[22] Filed: April 6, 1970

[21] Appl. No.: 25,747

[30] Foreign Application Priority Data
April 10, 1969 Great Britain......................18,538/69

[52] U.S. Cl..................................................61/72.4, 37/63
[51] Int. Cl. .........................................F16l 11/00, E02f 5/02
[58] Field of Search ..........................61/72.4, 72.1, 43; 37/63

[56] References Cited

UNITED STATES PATENTS

| | | |
|---|---|---|
| 3,256,695 | 6/1966 | Bodine, Jr............................61/72.3 X |
| 3,333,432 | 8/1967 | Hale et al...............................61/72.4 |
| 3,505,826 | 4/1970 | Harmstorf...............................61/72.4 |
| 3,429,131 | 2/1969 | Martin....................................61/72.4 |
| 3,103,790 | 9/1963 | Popich....................................61/72.4 |
| 2,693,085 | 11/1954 | Salnikov.................................61/72.4 |

*Primary Examiner*—Jacob Shapiro
*Attorney*—Holcombe, Wetherill & Brisebois

[57] ABSTRACT

Pipelines, including cables, are buried in the seabed, which includes the bed of other water covered areas, by a succession of trenching devices travelling along the pipeline one behind the other, the trenching devices each loosening the soil beneath the pipeline and conveying the loosened material from beneath the pipeline to successively increase the depth of a trench beneath it in a continuous and gradual manner whereby the pipeline is laid in the trench at a predetermined depth in a single pass of the trenching devices. The removed soil is used to backfill the trench after the pipe has been laid.

10 Claims, 6 Drawing Figures

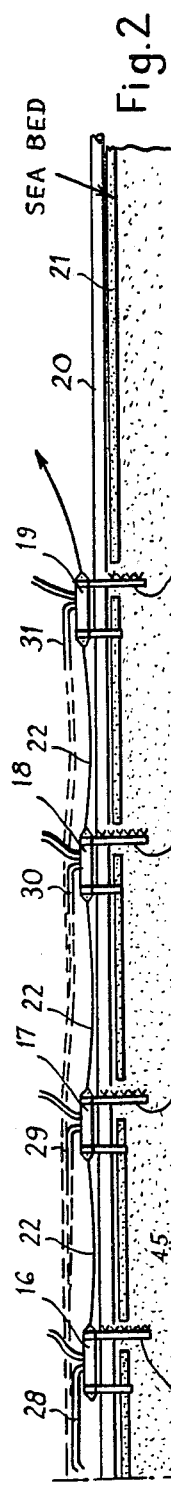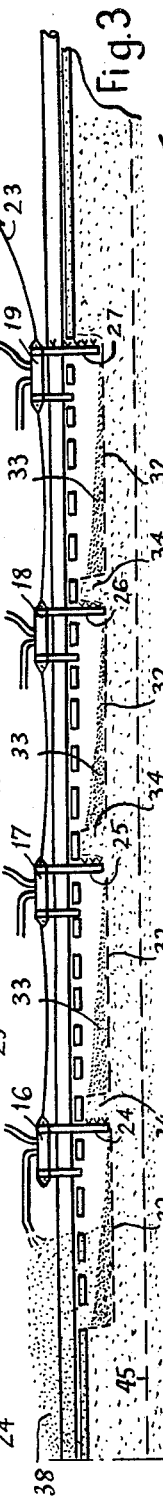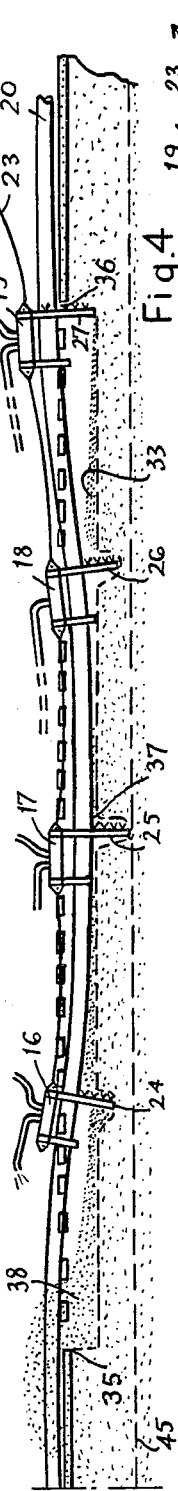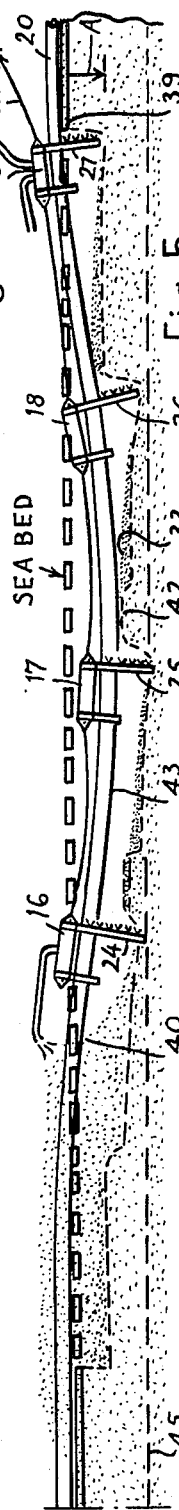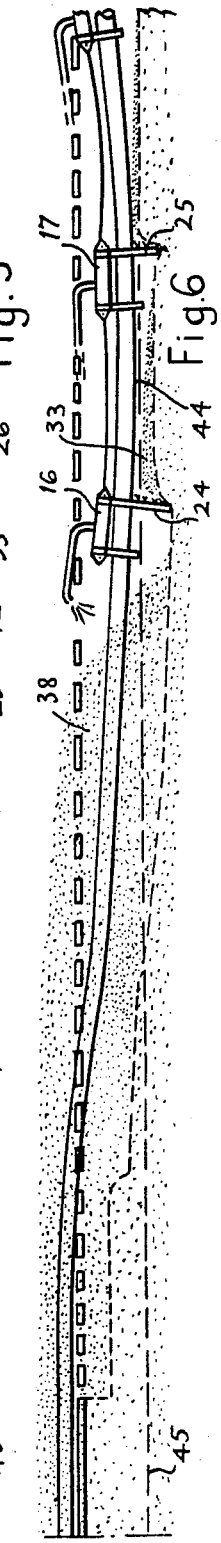

3,673,808

METHOD OF AND APPARATUS FOR BURYING SUB-SEA PIPELINES, CABLES AND THE LIKE

This invention relates to trenching methods and apparatus for burying pipelines, cable or the like in the bottom of the sea, which word is used herein to include rivers and other water areas.

In a known method of burying pipelines, cable or the like in the bottom of the sea use is made of a sledge which straddles the pipeline and carries vertical rows of water jets which can be moved vertically to a position below the pipeline to be buried. The jets are used to loosen the soil beneath the pipelines. One or more air-lift devices move the soil-water mixture upwards to discharge it above the sledge, dispersing it in the surrounding water. The sledge is towed along the pipeline in such way way that it will not exert excessive forces on the pipeline. In this way a trench is formed beneath the pipeline into which the pipeline sinks under its own weight. Where the soil is particularly hard either the power of the jets is increased or the sledge is equipped with one or more rotating cutting devices.

In U.S. Pat. No. 3,338,060 there is described one known arrangement for bedding flexible lines in the ground under water, which includes a rinsing apparatus fastened in a cradle which is supported between two parts of a sledge-like member for pivotal movement about a horizontal axis. The rinsing depth may be varied by pivoting the cradle from its normal vertical position. The lines for bedding in the ground may be supplied to the apparatus during the rinsing operation or first laid on the bottom of the ocean and then picked up and passed through the apparatus.

Difficulties are experienced with these methods when laying relatively stiff pipelines that have a large bending radius. In such cases the loosened soil material often fills up part of the trench which has just been formed before the pipeline can lay down on the bottom of the trench. For example, if the trench depth is about 10 to 15 feet, the distance between the sledge and the lower bend of the stiff pipeline where it touches the bottom of the trench may be several hundred feet. As the speed at which the trench can be cut is limited, the trench over such a distance often becomes partly filled up with bed material, which bed material may come from caving in of the sidewalls of the trench or from soil conveyed by water currents or from the discharge of the air-lift devices, before the pipeline reaches the bottom of the trench.

The present invention provides a method and apparatus by means of which this difficulty is minimized or overcome. In the method according to the invention a plurality of trenching devices spaced at appropriate distances from one another along a pipeline is employed in forming a trench. The trenching devices are advanced, one behind the other, along the pipeline, each succeeding device increasing the depth of the trench, whereby the trailing end of the trench is maintained in substantially perfect condition until the pipeline reaches the bottom of the trench and lies at the predetermined depth.

According to one aspect of the invention there is provided a method of burying pipelines, including cables, in the bottom of the sea (as herein defined) which includes the steps of positioning a plurality of trenching devices one behind the other along the pipeline, the trenching devices being designed to loosen the seabed beneath the pipeline and to convey the loosened material from beneath the pipeline, and advancing the devices in one direction only along the pipeline, successive ones of the trenching devices increasing the depth of a trench beneath the pipeline and being so spaced apart that the pipeline over which the devices have passed reaches a predetermined depth in the trench.

According to another aspect of the invention there is provided a trenching device for burying pipelines including cables in the bottom of the sea (as herein defined), the device being adapted to straddle a pipeline and to be moved in a forward direction along the pipeline and having means at its forward end for loosening the material of the seabed, suction means for removing the loosened material to form a trench into which the pipeline is laid and discharge means for discharging the material which has been removed into the trench formed thereby at the rear of the device and on top of the pipeline in the trench.

According to yet another aspect of the invention there is provided a trenching device for burying pipelines including cables in the bottom of the sea (as herein defined) the device being adapted to straddle a pipeline and having a first clamp movable along the pipeline and attached to the trenching device for clamping the device to the pipeline, a fluid operated piston and cylinder arrangement and a second clamp capable of being clamped to the pipeline and movable along the pipeline, the piston and cylinder arrangement being connected between the second clamp and the trenching device whereby operation of the said arrangement between alternate operations of the first and second clamping devices produces movement of the trenching device along the pipeline.

In a particular embodiment of the invention the trenching devices are coupled together to form a train and the material loosened from the seabed is conveyed to the rear of the train to provide reinstatement of the trench in which the pipeline has been laid as the train progresses along the pipeline.

Embodiments of the invention will now be described with reference to the accompanying drawings in which:

FIG. 1 schematically illustrates a section through the seabed and shows trenching devices burying a pipeline on the seabed, and FIGS. 2 to 6 are diagrammatic views of a train of trenching devices at different stages in the commencement of their operation.

Referring to FIG. 1 there are shown four trenching devices 1, 2, 3 and 4, which may be spaced about 50 feet from each other, positioned along a pipelines 5 laid initially on the seabed 5a. The number and spacing of the trenching devices will depend upon the type of soil, the stiffness of the pipeline, the strength of the water current and other factors. The trenching devices are coupled together by structures which are indicated diagrammatically by chain dotted lines 6 and which include provision for the connection of operating controls power supplies and cables between the devices. The trenching devices 1, 2, 3 and 4 thus form a train which is secured by a two-line 7 to a winch 8 on an anchored surface vessel 9, whereby operation of the winch causes the train to be advanced along the pipeline 5 to a point nearer to the vessel 9. Power supplies and operating controls are connected to the train of trenching devices by means of a cable 10. Each of the trenching devices, which may be of the same or a different construction, is mounted on a sledge 11 and is equiped with a forwardly directed suction pipe 12 on each side of the pipelines 5. The suction pipes 12 may be associated with a cutting device, a jetting device, a pumping device or combinations thereof also represented by the reference 12 for loosening the material to be removed from the seabed 5a by the pipes 12 thereby to form a trench 13. Each of the trenching devices is also provided with a respective discharge pipe 14, by means of which material removed from the seabed by the suction pipes 12 is conveyed to the rear of the train and used to infill the trench above the pipeline as indicated at 15. The material may be removed from the seabed and conveyed by a trenching device with the aid of known means, including by air-lift, jet pump, centrifugal pump or any other device. The material is preferably discharged at the rear of the last trench device in the way shown at 15 in order to provide the best chance of the removed material settling on top of the pipeline 5 resting on the bottom 13a of the trench 13. However, where desired the removed material may be conveyed to some other place.

In order to bury the pipeline 5 by means of the trenching devices 1, 2, 3 and 4 the pipeline is first laid on the seabed 5a and the trenching devices are then lowered over the pipeline and coupled together by the structures 6 with their discharge pipes 14 positioned in the way shown in FIG. 1. During lowering of the trenching devices on to the pipeline they are operated to cause seabed material to be removed from immediately beneath them so that they bed down on to the pipeline. At this stage the pipeline is supported at the level of the seabed 5a and the four trenching devices each have their suction pipes 12 extending into the seabed, to the same depth. The winch 8 is then operated to advance the train of trenching devices 1, 2, 3 and 4 along the pipeline as the suction pipes 12 are operated to remove the material from the seabed. With the trenching devices spaced apart from one another by distances of 50 feet, the pipeline 5 will be supported at the original seabed level, until just before each of the devices 2, 3 and 4 has travelled the 50 foot space in front of it, by the undisturbed portions of the seabed. However, after they have travelled the first 50 feet the devices 2, 3 and 4 will meet parts of the seabed which have already been lowered to a new level as a result of the removal of material by the suction pipes 12 of the preceding trenching devices. At this stage, and provided that the pipeline is sufficiently flexible over the 200 feet length of the excavation which has been made by the four devices to allow it, the suction pipes of the devices 2, 3 and 4 will extend into the surface of the seabed which is at the new level. With the pipeline 5 extending in a catenary-like curve over this excavated 200 foot length the device 3 will be at the point of maximum dip of the pipeline and its suction pipe 12 will extend beneath the surface at the new level by a slightly greater amount than those of the devices 2 and 4. However, as the trenching device 1 continues to move along the pipeline the sag of the pipeline gradually becomes greater and the devices 2, 3 and 4 excavate the trench to lower levels. It will be appreciated that this lowering process is gradual because the introduction of the backfill material 15 into the trench at the rear of the train provides support to the pipeline at the rear of the train at a level between the excavated level and that of the seabed. When the train has moved a distance of about twice its own length, the device 4 reaches an equilibrium depth and the pipeline is laid at a substantially constant depth. At this stage the material removed by the devices 1, 2, 3 and 4 substantially fills the trench behind the train to the height of the original seabed and the pipeline is laid in the trench at the substantially constant depth in the way shown in FIG. 1 so that is passes in an S-bend from the seabed to the bottom of the trench where it is covered by the infill material.

When the operation is ended the trenching devices are lifted off the pipeline and the S-bend section of the pipeline from which the train is removed is exposed. In an alternative method of starting the operation the trench is initially excavated by known means, for example by means of a dredger over a length of the pipeline equal to that of the train of trenching devices 1 to 4, so that each device commences the excavation operation at its respective level. It may be noted that the suction pipe 12 and any cutters of the device 4 in the arrangement shown in FIG. 1 extend below the device 4 to the same extent as do those of the devices 1, 2 and 3, and that the pipeline at the bottom of the trench is laid at a level above that of the suction pipe 12 of device 4. In certain conditions it is necessary to cause the device 4 to excavate to a level below the final level at which the pipeline is to be laid, the difference between these two levels being made up by normal filling in which gradually occurs due to caving-in of the trench walls and/or the normal load of material present on the seabed. In other conditions the depth of the suction pipe 12 below the device 4 may be reduced in comparison with the depths of the pipes 12 below the devices 1, 2 and 3 in order to provide an excavation only to the depth at which the pipeline is to be laid. The loosened material is drawn into the trenching devices by means of the suction pipes 12 and discharged via the pipes 14 at the rear of the train as indicated at 15 in order to infill the trench in the way described above.

Referring to FIG. 2 four trenching devices forming a train are represented at 16 to 19 positioned on a pipeline 20 resting on a surface layer 21 of the seabed. The devices 16 to 19 are coupled by structures indicated at lines 22 and are towed along the seabed by a surface vessel (not shown) by way of a tow-line 23. The trenching devices 16 to 19 have respective pairs of suction pipes 24 to 27 and with the pumps and forward acting jets on each device working the pipes 24-27 penetrate the seabed to remove material therefrom, the material removed being conveyed to the rear of the train via discharge pipes indicated at 28 to 31. The devices 16 to 19 are spaced apart from one another by distances of 50 feet and, as may be seen from FIG. 3, when they are pulled along the seabed each device cuts an equal length of trench having a bottom at 32 on which material 33 gradually accumulates due to caving-in of the trench walls and from the normally present bedload. In the position shown in FIG. 3 there is a small length 34 of original seabed in front of each device supporting the pipeline. In between these supports the pipeline is freely suspended, but it sags only very little. Further movement of the devices removes the remaining supports 34 at the moment that the device 18 reaches the starting position of unit 19.

At this stage the pipeline 20 is unsupported between the support positions 35 and 36 (FIG. 4) and will sag in what may be termed a double S-bend, as indicated in FIG. 4. Supposing the train to be slightly longer than the required S-bend in the continuous trenching operation the amount of sagging in this position will only be about one-quarter to one-third of the required burying depth. Depending on the depth of the jetting arms or pipes protruding below the pipeline, it is also possible that the pipeline will find a support in the middle of the double S-bend, as indicated at 37. This will also depend on the number and the spacing of the devices as well as on the amount of silt deposited in between the devices.

Because of the bending of the pipeline, the devices 17, 18 and 19 will now suddenly be able to remove the soil at a greater depth than in the situation shown in FIG. 3, the device 17 having the deepest level of penetration.

In the meantime the soil dug from the full length of the train is deposited as indicated at 38 behind the device 16 over a very short length. Ergo there will be an excess of soil over the length the device 16 has been moved. This excess of soil might e easily removed by currents and waves at a later time. Only after the train has moved about twice its own length will device 16 have reached about its equilibrium depth and then the soil dug by the units will just be able to fill the trench to about the height of the original seabed.

Further moving of the train will cause the devices 16 and 17 to penetrate further and further as illustrated in FIG. 5.

The pipeline 20 is supported at the stage shown in FIG. 5 at position 39 and at about position 40 and it may be seen that the double S-bend has about the same length of free suspension as in FIG. 4. Support 40 however is at a lower level than the support 35 in FIG. 4. Consequently the level of the pipeline at about the position 42 of FIG. 5 will be lower than in the synonymous position 37 of FIG. 4. The levels at 37 in FIG. 4 and at 43 in FIG. 5 will be approximately the same.

The process continues for the stage shown in FIG. 6 in a similar way to that shown in FIG. 5. The deepest level of the pipeline at position 44 in FIG. 6 will be at a lower level than the synonymous level of the pipeline at position 42 in FIG. 5.

It is obvious that the location of the lowest point in the pipeline relative to the train has shifted from device 17 in the direction of device 18. After the train has been travelling over a distance of about 2 to 3 times its own length, the lowest point of the pipeline will be at the tail end of the train; a deeper level cannot be obtained and equilibrium is reached. The pipeline will be at the required level marked 45 in FIGS. 2 to 6. A change in the burying depth can be obtained by changing the digging capacity, i.e. the digging depth underneath the pipeline, of the device 16.

It should be noted that the theoretrical maximum depth of burying is the sum of the penetration depths of all the devices as measured from the bottom of the pipeline. ($\epsilon$ "A" as shown in FIG. 5).

When the operation is stopped and the devices are lifted off the pipeline there will be a section of train length where the pipeline is curved in its S-bend from the burying level to seabottom level. This section of pipeline will not be covered by soil (the amount of soil missing will be the same as the excess soil experienced at the start of the operation).

The use of flexible connections between the surface vessel and the trenching units for the connection of electric power, water at high pressure for the supply of the water jets, and air to regulate the buoyancy of the trenching devices etc. enables the surface vessel to be positioned favorably with respect to wind or current. Multicore cables may also be used for steering and control purposes. The electro-hydraulic systems may be automatically controlled, though manual control may be employed if required.

The positioning of the surface vessel may be controlled either by anchors or by Voith - Schneider propellers.

In the particular embodiments described the trenching devices of a train are directly connected together by means of coupling structures extending along the pipeline. However, it is possible, where the trenching devices are self-propelled, for there to be nor direct connections between the trenching devices and for them to be controlled independently from the surface vessel. It is also possible for the trenching devices to be controlled separately from different surface vessels. Where the trenching devices are directly connected together the coupling structures may be either rigid or flexible and arranged in such a way that the units follow one another at the desired spacings. The spacings between the trenching devices may differ along the length of the train in order to produce required degrees of bending of the pipeline being laid over the length of the train. The trenching devices may be designed to travel on sledges, on wheels cooperating with tracks or on walking devices instead of being towed by a surface vessel or being self-propelled in the ways described above.

I claim:

1. A method of burying pipelines, including cables, in the bottom of the sea (as herein defined) which includes the steps of positioning a plurality of trenching devices one behind the other along the pipeline, each of the trenching devices having forwardly directed suction pipes and being designed to loosen the seabed beneath the pipeline and to convey the loosened material from beneath the pipeline, and advancing the devices in the direction of the forwardly directed suction pipes only along the pipeline, successive ones of the trenching devices increasing the depth of a trench beneath the pipeline until the pipeline reaches a predetermined depth therein during a single pass of the said devices in the one direction only and the number of the trenching devices and the spacing between the devices being such that the pipeline is formed into an "S" shaped bend as it is laid into the trench.

2. A method as claimed in claim 1 wherein the trenching devices are coupled together to form a train.

3. A method as claimed in claim 1 including the step of conveying the loosened material to the rear of the plurality of devices to provide infill for the trench as the devices progress along the pipeline.

4. A method as claimed in claim 1 including the step of loosening the material by means of jets of water.

5. A method as claimed in claim 1 including the step of loosening the material by means of a cutter.

6. A method as claimed in claim 2 including the step of advancing the trenching devices along the pipeline by means of a tow line attached to the leading device in the train.

7. For use in the method of claim 1 a trenching device for burying pipelines including cables in the bottom of the sea (as herein defined), the device being adapted to straddle a pipeline and to be moved in a forward direction along the pipeline and having means at its forward end for loosening the material of the seabed, forwardly directed suction means positioned in proximity to the said forward end for removing the loosened material to form a trench into which the pipeline may be laid and discharge means for discharging material which has been removed by the suction means into the trench formed at the rear of the device and on top of the pipeline in the trench.

8. A trenching device as claimed in claim 7 operable to remove seabed material from beneath it, whereby it may bed down on to the pipeline.

9. A trenching device as claimed in claim 7 having a jetting device for loosening the material of the seabed.

10. A trenching device as claimed in claim 7 having a cutting device for loosening the material of the seabed.

* * * * *